United States Patent Office 3,803,194
Patented Apr. 9, 1974

3,803,194
CYCLIC UREA DERIVATIVES AND PROCESS FOR THEIR MANUFACTURE
Hans D. Golitz, deceased, late of Cologne-Stammheim, Germany, by Ingrid Irene Klärchen Gölitz, heiress, Cologne, Rudolf Merten, Leverkusen, Walter Noll, Opladen, and Walter Simmler, Odenthal-Gloebusch, Germany, assignors to Bayer Aktiengesellschaft, Leverkusen, Germany
No Drawing. Continuation of application Ser. No. 81,515, Oct. 16, 1970, now Patent No. 3,725,449. This application Aug. 3, 1972, Ser. No. 277,840
Claims priority, application Germany, Oct. 29, 1969, P 19 54 447.9
Int. Cl. C07f 7/08, 7/18; C07d 103/02
U.S. Cl. 260—448.2 N         14 Claims

ABSTRACT OF THE DISCLOSURE

Novel cyclic urea derivatives containing silicon atoms have the general formula

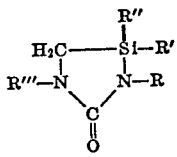

wherein R is a hydrocarbon radical optionally being interrupted by oxygen atoms in ether linkages, R' and R'' (same or different) are hydrocarbon radicals, halohydrocarbon radicals, cyanohydrocarbon radicals, or alkoxy radicals, and R''' is a hydrocarbon radical.

These 2,5-diaza-3-silacyclopentanones can be produced, according to the invention, by reacting an aminomethylalkoxysilane of the general formula

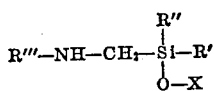

(R', R'' and R''' as above; X=alkyl) at a temperature between 0 and 250° C. with an isocyanate of the general formula RNCO (R as above) and recovering the product by distillation under reduced pressure.

These products are suitable for promoting the adhesion of synthetic resins to siliceous surfaces, for use as intermediates for organopolysiloxane resins, and for use as cross-linking agents in water-reactive organopolysiloxane preparations.

---

This is a continuation of application Ser. No. 81,515 filed Oct. 16, 1970 now Pat. No. 3,725,449.

The present invention relates to new cyclic urea derivatives containing silicon atoms, which derivatives are suitable for strengthening the adhesion of synthetic resins to silicious surfaces when used as an intermediate layer, for use as intermediates in the manufacture of organopolysiloxane resins, and for use as crosslinking agents in organopolysiloxane compositions which can be converted into elastomers at room temperature by reaction with water.

These new urea derivatives are 2,5-diaza-3-silacyclopentanones of the general formula

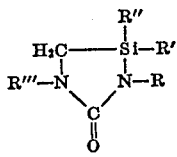

wherein

R is a saturated aliphatic or cycloaliphatic, olefinic or aromatic hydrocarbon radical having at most 15 carbon atoms, which is optionally interrupted by one or more ether oxygen atoms,
R' and R'' (which are the same or different) are optionally halogen-substituted or cyano-substituted saturated aliphatic or cycloaliphatic, olefinic or aromatic hydrocarbon radicals having at most 10 carbon atoms, or alkoxy radicals having 1 to 4 carbon atoms, and
R''' is a saturated aliphatic or cycloaliphatic, olefinic or aromatic hydrocarbon radical having at most 10 carbon atoms.

These heterocyclic compounds may be produced, according to the invention, by reacting an aminomethylalkoxysilane of the general formula

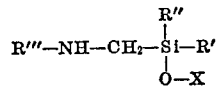

wherein R', R'' and R''' are as above and X is an alkyl radical having 1 to 4 carbon atoms, at a temperature between 0 and 250° C., if necessary with initial cooling and subsequent heating, with an equimolar amount or a slight excess (for example 10%) of an isocyanate of the general formula RNCO, wherein R is as above, and isolating the reaction products by fractional distillation under reduced pressure.

The aminomethylalkoxysilanes to be used in the above process may be obtained according to known methods, for example by reaction of a halogenomethylalkoxysilane with a primary amine. The entire process then takes place in accordance with the following reaction scheme:

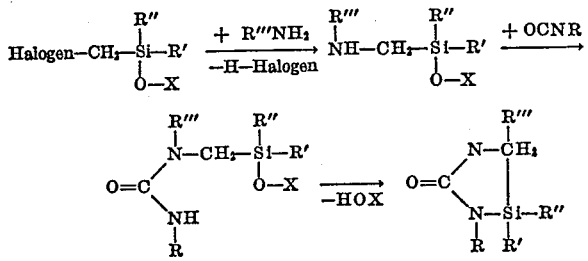

Suprisingly, the alkoxysilylmethylureas which are formed first (approximately in the temperature range 0 to 130° C.) in accordance with the known method of an isocyanate addition, cyclize at a moderately elevated temperature, as a rule between 30 and 250° C., with elimination of alcohol. The subsequent distillation of the reaction mixture, which should as a rule be carried out at a pressure of between 0.01 and 100 mm. of mercury, completes the process and furnishes the heterocyclic compounds according to the invention as mostly colorless, liquid distillates of pleasant odor, in a yield of between 60 and 95%. The Si—N and Si—O bonds of these compounds can easily be split by hydrolysis.

The following examples are given for the purpose of illustrating the invention.

EXAMPLE 1

61 g. (0.49 mol) cyclohexyl isocyanate are added dropwise to 90 g. (0.49 mol) methyl-(methylaminomethyl)-di-ethoxy-silane, with exclusion of moisture and whilst stirring, the temperature being at between 15 and 30° C. by external cooling with ice. Thereafter the reaction mixture is distilled under reduced pressure and a colorless liquid of refractive index $n_D^{20}=1.4870$ is obtained as a fraction which passes over at 0.65 mm. of mercury between 140 and 142° C. This product has the structural formula

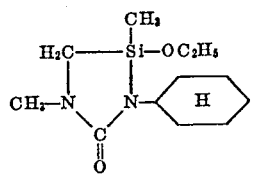

EXAMPLE 2

19.8 g. (0.166 mol) phenyl isocyanate are added to 41 g. (0.166 mol) methyl-(n-butylaminomethyl)-diisopropoxysilane in the manner described in Example 1. The crystalline product first obtained hereby is distilled after fusing under reduced pressure, and at 0.4 mm. of mercury and 154° C. a liquid fraction is obtained, having a refractive index of $n_D^{20}=1.5170$ and a structure in accordance with the formula

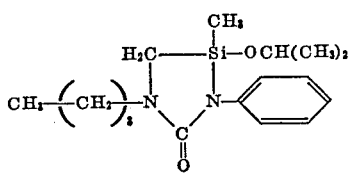

EXAMPLE 3

49. g. (0.2 mol) methyl-(cyclohexylaminomethyl)-diethoxysilane are reacted with 17.4 g. (0.2 mol) methoxymethyl isocyanate analogously to the preceding examples, and on distillation a liquid fraction which passes over between 143 and 145° C. at 0.6 mm. of mercury is obtained, having a refractive index $n_D^{20}=1.4815$ and a structure of formula

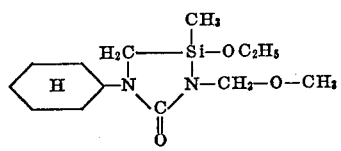

EXAMPLE 4

50 g. (0.4 mol) cyclohexyl isocyanate are added dropwise to 100 g. (0.364 mol) (cyclohexylaminomethyl)-triethoxysilane, with exclusion of moisture and whilst stirring, with the temperature being allowed to rise to 60° C. Distillation at 0.01 mm. of mercury between 183 and 190° C. yields a liquid fraction having a refractive index of $n_D^{20}=1.4912$ and a structure in accordance with the formula

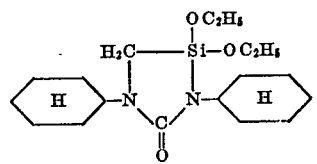

EXAMPLE 5

47.6g. (0.4 mol) phenyl isocyanate are added dropwise to 100 g. (0.364 mol) (cyclohexylaminomethyl)-tri-ethoxysilane at temperatures between 0 and 10° C., analogously to Example 1. Subsequent distillation at 0.03 mm. of mercury between 167 and 172° C. yields a liquid fraction having a refractive index of $n_D^{20}=1.5255$ and a structure in accordance with the formula

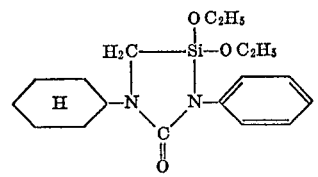

EXAMPLE 6

50 g. (0.4 mol) cyclohexyl isocyanate are added dropwise to 86 g. (0.4 mol) dimethyl-(cyclohexylaminomethyl)-ethoxysilane at temperatures between 0 and 20° C., analogously to Example 1. Subsequent distillation at 0.07 mm. of mercury between 150 and 160° C. yields a fraction which solidifies on cooling, having a melting point of 147° C. and a structure in accordance with the formula

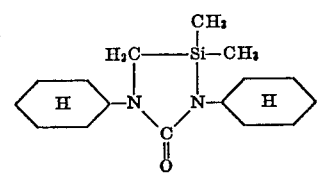

EXAMPLE 7

98 g. (0.4 mol) methyl-(cyclohexylaminomethyl)-diethoxysilane are reacted with 50 g. (0.4 mol) cyclohexyl isocyanate analogously to the preceding example, and on subsequent distillation a fraction which passes over at 0.07 mm. of mercury between 167 and 170° C. and which solidifies on cooling is obtained. This product melts between 65 and 68° C., and has the structural formula

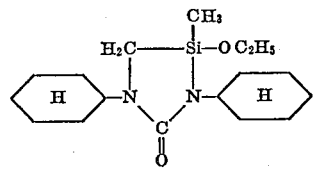

EXAMPLE 8

17.4 g. (0.147 mol) phenyl isocyanate are added dropwise to 30 g. (0.147 mol) methyl-(methylaminomethyl)-diisopropoxysilane analogously to Example 1, at temperatures between 20 and 30° C. Subsequent distillation yields, at a pressure of between 0.9 and 1 mm. of mercury, a liquid fraction which passes over between 157 and 165° C., having a refractive index of $n_D^{20}=1.5293$ and a structure of formula

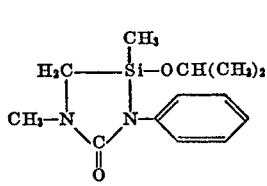

EXAMPLE 9

49.5 g. (0.18 mol) (cyclohexylaminomethyl)-triethoxysilane are reacted with 10.3 g. (0.18 mol) methyl-isocyanate analogously to the preceding example. Subsequent distillation yields, at a pressure of between 0.6 and 1 mm. of mercury, a liquid fraction which passes over between 161 and 165° C. having a refractive index of $n_D^{20}=1.4735$ and a structure of formula

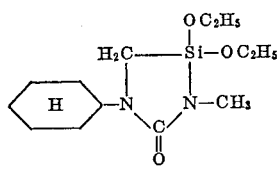

EXAMPLE 10

33.2 g. (0.4 mole) allyl isocyanate are added to 100 g. (0.364 mol) (cyclohexylaminomethyl)-triethoxysilane analogously to Example 4, with the temperature being allowed to rise to 80° C. Distillation at 0.01 mm. of mercury between 133 and 143° C. yields a liquid fraction having a refractive index of $n_D^{20}=1.4820$ and a structure according to the formula

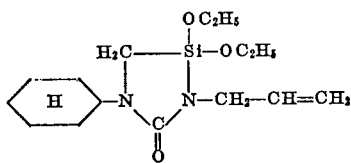

EXAMPLE 11

62.5 g. (0.5 mol) cyclohexyl isocyanate are admixed with 134.5 g. (0.5 mol) (phenylaminomethyl)-triethoxysilane whilst stirring and excluding moisture, at a temperature which is initially kept between 15 and 25° C. Thereafter the reaction mixture is heated to 120° C. for 4 hours and is subsequently distilled. Hereupon a fraction is obtained in the pressure range of 0.6 to 1 mm. of mercury between 180 and 192° C., which has a structure of formula

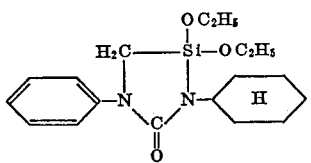

EXAMPLE 12

37.5 g. (0.3 mol) cyclohexyl isocyanate are added dropwise to 52 g. (0.3 mol) dimethyl-(allylaminomethyl)-ethoxysilane analogously to the preceding example, at a temperature initially kept between 10 and 40° C. Thereafter the rection mixture is distilled and in doing so a fraction passing over between 150 and 154° C. in the pressure range of between 1 and 1.4 mm. of mercury is obtained, having a structure in accordance with the formula

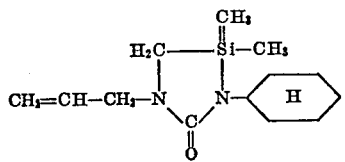

What is claimed is:
1. 2,5-diaza-3-silacyclopentanones of the general formula

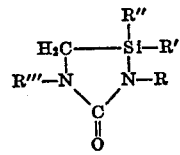

wherein

R is a monovalent radical having up to 15 carbon atoms and being selected from the group consisting of alkyl, cycloalkyl, alkinyl and aromatic hydrocarbon radicals and radicals composed of carbon, hydrogen and oxygen in the form of an ether linkage, R' is a monovalent radical having up to 10 carbon atoms, selected from the group consisting of saturated aliphatic, cycloaliphatic, olefinic, aromatic, halogen substituted saturated aliphatic, halogen substituted cycloaliphatic, halogen substituted olefinic, halogen substituted aromatic, cyano substituted saturated aliphatic, cyano substituted olefinic and cyano substituted aromatic hydrocarbon radicals, R" is a monovalent radical selected from the group consisting of the radicals as defined for R' and alkoxy radicals having 1 to 4 carbon atoms, and R''' is a hydrocarbon radical having up to 10 carbon atoms and being selected from the group consisting of saturated aliphatic, cycloaliphatic, olefinic and aromatic hydrocarbon radicals.

2. Process for the manufacture of a 2,5-diaza-3-silacyclopentanone according to claim 1 which comprises reacting an amino-methylalkoxysilane of the general formula

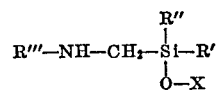

wherein X is an alkyl radical having 1 to 4 carbon atoms, with an amount being from the equimolar proportion to a slight excess of an isocyanate of the general formula RNCO, at a temperature between 0 to 250° C., and isolating the reaction products by fractional distillation under reduced pressure.

3. Process according to claim 2, wherein the reactants are initially cooled and are subsequently heated.

4. Process according to claim 2 wherein the isocyanate is used in an excess of up to 10 mole percent.

5. Process according to claim 2 wherein the fractional distillation is carried out at a pressure of 0.01 to 100 mm. of mercury.

6. 2 - cyclohexyl - 3,5 - dimethyl - 3 - ethoxy - 2,5-diaza-3-silacyclopentanone.

7. 2 - phenyl - 3 - methyl - 3 - isopropoxy - 5 - n - butyl-2,5-diaza-3-silacyclopentanone.

8. 2 - methoxymethyl - 3 - methyl - 3 - ethoxy - 5-cyclohexyl-2,5-diaza-3-silacyclopentanone.

9. 2,5 - dicyclohexyl - 3,3 - dimethyl - 2,5 - diaza - 3-silacyclopentane.

10. 2,5 - dicyclohexyl - 3 - methyl - 3 - ethoxy - 2,5-diaza-3-silacyclopentanone.

11. 2 - phenyl - 3,5 - dimethyl - 3 - isopropoxy - 2,5-diaza-3-silacyclopentanone.

12. 2 - cyclohexyl - 3,3 - dimethyl - 5 - allyl - 2,5-diaza-3-silacyclopentanone.

13. A compound as claimed in claim 1 wherein R''' is a member selected from the group consisting of cyclohexyl and phenyl.

14. A compound as claimed in claim 13 wherein R is a member of a group consisting of methyl, cyclohexyl, allyl and phenyl.

References Cited
UNITED STATES PATENTS

| | | | |
|---|---|---|---|
| 3,436,415 | 4/1969 | Finkbeiner | 260—448.8 R |
| 3,436,416 | 4/1969 | Finkbeiner et al. | 260—448.8 R |
| 3,725,449 | 4/1973 | Golitz et al. | 260—448.8 R |
| 3,663,586 | 5/1972 | Golitz et al. | 260—448.2 N |

DANIEL E. WYMAN, Primary Examiner

P. F. SHAVER, Assistant Examiner

U.S. Cl. X.R.

117—129 F; 260—448.2 E, 448.8 R